Sept. 21, 1965   J. A. MacDOUGAL   3,207,960
MECHANICAL MAGNETIC SOLENOID DEVICE
Filed Aug. 30, 1962
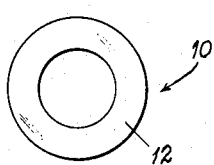
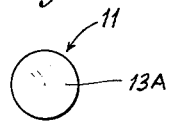
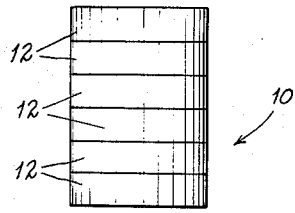
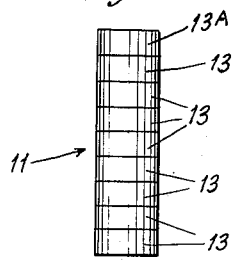
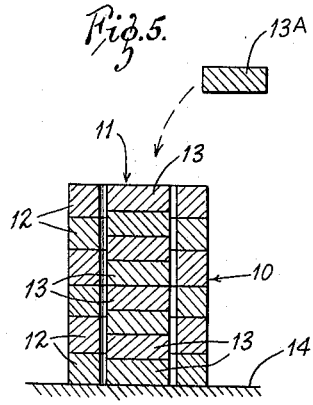
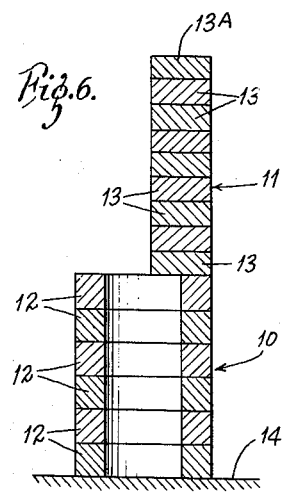
INVENTOR:
JOHN A. MACDOUGAL,
BY Kingsland, Rogers, Ezell & Robbins
ATTORNEYS United States Patent Office 3,207,960
Patented Sept. 21, 1965

3,207,960
MECHANICAL MAGNETIC SOLENOID DEVICE
John Angus MacDougal, St. Louis, Mo., assignor to Magic Decorator Company, St. Louis, Mo., a corporation of Missouri
Filed Aug. 30, 1962, Ser. No. 220,362
4 Claims. (Cl. 317—158)

This invention relates to a magnetic solenoid device. In general, the invention comprises an outer ring assembly and an inner core assembly. The outer ring assembly is composed of a plurality of individual permanent magnet rings which, when properly oriented relative to one another, arrange themselves in a stack to define a cylinder. The inner core comprises a plurality of permanent magnet disks which attract one another when properly oriented to form a single solid core. The diameter of the core allows it to fit within the outer ring assembly or cylinder.

The relationship between the masses of the outer ring and inner core assemblies and the magnetic field strength can be established so that when the outer ring assembly is placed with one end against a non-magnetic flat surface and one disk is removed from the inner core assembly, the remaining inner core assembly can be pushed into the outer ring assembly and will remain in place even though like poles are opposite one another. This will be true providing the maximum height of the inner core assembly without the removed disk is about equal to or only slightly greater than the height of the outer ring assembly. Under these conditions, the repelling forces at the ends of the ring assembly and the core assembly are nearly equalized, and the core remains in place because of the flat surface. However, when the extra disk is dropped onto the top of the core, it snaps against the core and disrupts the balance of magnetic forces between the core assembly and the outer ring assembly. With the core now taller than the outer ring assembly, it pops out of the outer ring assembly until the lower end of the core, which is of opposite polarity to the top of the outer ring assembly, is attracted onto the top of the outer ring assembly.

The general object of this invention is to provide a mechanical magnetic solenoid device comprising an outer ring assembly and an inner core assembly that can be stored in nested trigger relationship with a triggering magnetic disk that can cause the core to jump clear of the outer ring assembly.

Another object of the invention is to provide a mechanical magnet solenoid device comprising an outer ring assembly and an inner core assembly made of permanent magnets wherein the core assembly, after being stored within the outer ring assembly, can be made to spring from the outer ring assembly without recall in the outer ring assembly.

Still another, and important, object of the invention is to provide a mechanical magnetic solenoid device that can be played with as an object of endless amusement and fascination.

Yet another object of the invention is to provide a mechanical magnetic solenoid device comprising an outer ring assembly and an inner core assembly each made of a plurality of individual permanent magnets that can be assembled in a variety of numbers and manners to provide a versatile source of interesting operating effects.

Yet another object of the invention is to provide a mechanical magnetic solenoid device that is inexpensive to manufacture but has a variety of uses.

Other objects and advantages will be apparent to those skilled in the art.

In the drawing:

FIGURE 1 is a plan view of the outer ring assembly;
FIGURE 2 is a side elevation view of the outer ring assembly;
FIGURE 3 is a plan view of the inner core assembly;
FIGURE 4 is a side elevation view of the inner core assembly;
FIGURE 5 is a view in section along a diameter of the outer ring and inner core assemblies when they are in nested position, showing the removed triggering or actuating disk, and
FIGURE 6 is a view in section taken along a diameter of the outer ring assembly and the inner core assembly and showing the relative positions of the parts following actuation of the device.

Referring now to the drawing, the magnetic solenoid device comprises an outer ring assembly 10 and an inner core assembly 11, shown in FIGURES 2 and 4, respectively. The outer ring assembly 10 comprises a plurality of individual rings 12, and the inner core assembly 11 comprises a plurality of individual disks 13. The number of rings 12 and disks 13 may be varied, but for reasons that will be explained, they must have a certain relationship to one another. A successful number of these parts shown in the illustrative embodiment herein described is six outer rings 12 and nine inner disks 13. When one of the disks 13, such as the upper one 13A, is removed, the remaining core assembly 11 should be substantially equal in height to the height of the assembled outer ring assembly 10. These heights are achieved if each outer ring is 1/4" high and each inner disk 13 is 9/16" high.

The outer rings 12 and inner disks 13 are made of ceramic barium ferrite permanent magnets with each part magnetized through its thickness. Each outer ring 12 is 1 3/16" in outer diameter and 9/16" in inside diameter. Each inner disk 13 is 1/2" diameter, with is 1/16" less than the inside diameter of the rings 12.

When the outer rings 12 are oriented with opposite magnetic poles adjacent one another, they are mutually attracted to an assembled unit as illustrated in FIGURE 2. Likewise, the disks 13 can be oriented to form a unitary core assembly as illustrated in FIGURE 4. One end of the outer ring assembly 10 has a north magnetic pole and the other end a south magnetic pole; and one end of the inner core assembly 11 has a north magnetic pole and the other end has a south magnetic pole.

If the entire core assembly 11 is inserted into the outer ring assembly 10 with like poles adjacent one another, the inner core assembly will jump up from the outer ring assembly. This action occurs because like magnetic poles repel one another and the upper end of the inner core projects above the upper end of the outer ring assembly. The like magnetic poles repel one another and cause the inner core assembly 11 to jump upwardly. As the lower end of the inner core assembly 11 approaches the upper end of the outer core assembly 10, the opposite magnetic poles at these ends begin to attract one another. If the sizes and masses of the magnets are in proper relationship to the magnetic field strength, this magnetic attraction will cause the inner core assembly to jump over and rest on top of the outer ring assembly 10. This last mentioned relationship can be determined by short experimentation with any number of magnets of varying sizes, and the dimensions mentioned heretofore are merely illustrative of sizes that will work.

If the outer ring assembly 10 is placed vertically on a flat horizontal surface 14 and one of the disks 13A is removed (the disk 13A being identical to the disks 13 with the subscript A being added merely to indicate the disk is an actuator disk) the foregoing action will not immediately occur. Without the actuator disk 13A, when the inner core assembly 11 is inserted into the outer ring assembly 10, even with like magnetic poles adjacent one another, the core will remain in place. This condition of equilibrium exists because now the height of the inner core assembly 11 is the same as the height of the outer ring assembly 10. With the stabilizing effect of the horizontal flat surface 14, the magnetic repellant forces are substantially equal in both upward and downward directions. They may even be a slight net upward repelling force so long as the force of gravity is sufficient to overcome that force.

The equilibrium can be broken if the actuator disk 13A is dropped toward the inner core assembly 11. The magnetic forces will cause the disk 13A to orient itself in the air as it is falling toward the core assembly 11 so that the pole of the disk 13A nearest the core assembly 11 will be opposite in polarity to the magnetic pole at the upper end of the core assembly 11. Also, since the magnetic polarity at the upper end of the ring assembly 10 is the same as the polarity at the upper end of core assembly 11, the strongest attractive force is at the center of both, e.g., at the center of the core assembly 11. Therefore, the actuator disk 13A will snap against the upper end of the core assembly 11 and break the equilibrium of magnetic forces. The now taller core assembly 11 will jump up from the outer ring assembly 10, clearing the ring assembly, and then coming to rest on the upper end of the ring assembly as illustrated in FIGURE 6.

Various changes and modifications may be made within the process of this invention as will be readily apparent to those skilled in the art. Such changes and modifications are within the scope and teaching of this invention as defined by the claims appended thereto.

What is claimed is:

1. A mechanical magnetic solenoid device comprising an outer ring assembly and an inner core assembly, the diameter of the inner core assembly being less than the inside diameter of the outer ring assembly to permit insertion of the core assembly into the ring assembly, the core and ring assemblies being permanently magnetized, and the core assembly comprising at least two separate elements each magnetized, the height of the core assembly when one of the elements is removed being substantially equal to the height of the ring assembly, so that when the ring assembly is rested upon a horizontal surface with its axis extending vertically, and the core assembly is positioned axially within the ring assembly with like poles adjacent one another, the core assembly without the said one element will be held within the ring assembly by magnetic repulsion whereas addition of the said one element to the core assembly will cause the core assembly to be driven from the ring assembly by magnetic repulsion.

2. A mechanical magnetic solenoid device comprising an outer cylinder and an inner core slidable axially within the cylinder, the outer cylinder comprising a plurality of individual permanent magnet rings, and the inner core comprising a plurality of individual permanent magnet disks removably held together by magnetic attraction, the inner core with one disk removed being receivable within the outer cylinder with like magnetic poles adjacent one another and being sized to be held therein by magnetic repelling forces, addition of the said one disk shifting the relative positions of magnetic poles to drive the inner core from the cylinder.

3. The device of claim 2 wherein there are more disks than rings.

4. A mechanical magnetic solenoid device comprising means defining an outer elongated magnetized ring having an axial bore through it, a plurality of individual magnetized disks sized to be stacked as a unitary inner core assembly slidable within the axial bore, the relative heights of the ring and inner core assembly as measured between the pole ends thereof being such that when like magnetic poles of the ring and inner core assembly are adjacent one another with the core assembly within a bore against a restraining surface at one end thereof, removal of one disk will cause the magnetic repelling forces to hold the core assembly within the bore whereas addition of the said one disk to the core assembly will cause the core assembly to be driven from the bore by the magnetic repelling forces.

References Cited by the Examiner

UNITED STATES PATENTS

| 1,669,658 | 5/28 | Elmen | 46—236 |
| 2,906,929 | 9/59 | Wyckoff | 317—201 |
| 2,999,275 | 9/61 | Blume | 17—201 |

JOHN F. BURNS, *Primary Examiner.*